United States Patent Office 3,497,367
Patented Feb. 24, 1970

---

3,497,367
OPALINE MATERIALS AND METHOD OF PREPARATION
Arthur John Gaskin, Elwood, Victoria, and Peter John Darragh, Blackburn, Victoria, Australia, assignors to Commonwealth Scientific and Industrial Research Organization, East Melbourne, Victoria, Australia, a body corporate
No Drawing. Filed Sept. 29, 1965, Ser. No. 491,427
Claims priority, application Australia, Oct. 2, 1964, 50,029/64
Int. Cl. C04b 35/14
U.S. Cl. 106—42
22 Claims

ABSTRACT OF THE DISCLOSURE

A method of preparing opaline materials by growing members of spherical amorphous silica particles by concentrating an aqueous solution of silica as the mother liquor and using colloidal hydrous silica particles as nuclei, separating from the liquor a fraction comprising particles of substantially uniform size within the range of about 150–450 millimicrons, packing the said particles into a close-packed array by sedimentation under gravity or centrifugation and stabilizing the spatial arrangement of the particles constituting the array, by drying, heating or by the use of a cement, the said array being so ordered as to provide a material giving rise to diffracted colored light beams when illuminated with white light.

---

This invention relates to a method of preparing materials which show some of the characteristics of natural precious opal, in particular a play of colours and a chemical composition essentially comprising silica which may be in a more or less hydrated state. Such materials are hereinafter referred to as "opaline materials."

The main characteristics of opal are that it is a more or less amorphous variety of hydrous silica, commonly translucent to some extent and often having the faint blue or blue-purple colour typical of colloidal suspensions or gels which contain small particles of the size range necessary to cause light-scattering effects such as those that give "Tyndall blue" colours and other well-known optical phenomena. The ordinary varieties of silica gels prepared from alkaline silicate solutions and other silica-bearing materials sometimes show these blue tints caused by light scattering.

The much rarer variety of opal which shows colours other than faint blue or blue-purple tints is generally referred to as "precious" opal, though the value of any particular specimen in this class may be small if it shows colours limited to blue and green and of little greater brightness than the blue and purple scattering colours shown by common opal.

Although it is a simple matter to prepare a silica gel which, when dried out to a water content of between 5% and 20%, will exhibit most of the properties of common opal, including a display of faint blue or blue-purple scattering tints, there has never been reported, to our knowledge, any method of preparing a hydrous silica material generally comparable with "precious" opal.

The present invention is based upon our discovery that colours similar to those shown by precious opal are produced by means of diffraction effects in which incident white light penetrating into translucent hydrous silica meets ordered arrays of more or less spherical particles having diameters lying within a narrow range. We have further observed that diffracted beams having colours dependent on the angles of viewing, the refractive index of the material and the perfection of the ordered arrays of constituent particles in the mass, are obtained if the diameters of the constituent particles in a particular array lie within a narrow range and the mean diameter of particles in the arrays lies within the range 150–450 millimicrons. The maximum wave-length $W_m$ of the beams diffracted from the main planes (111) of a simple close-packed cubic structure would, for an array of hydrous silica spheres with refractive index 1.45, be related to the mean particle diameter $(d)$ by a factor of 2.37, i.e. $W_m = 2.37d$. For example, an array of spherical particles having a mean diameter of 220 millimicrons would strongly diffract beams of green light of wave-length 521 millimicrons.

A major distinction may therefore be drawn between ordinary Tyndall scattering, by which blue or blue-purple tints are produced by particles of any size less than 100 millimicrons in diameter, even down to 10 millimicrons when randomly suspended in a liquid as in a colloidal sol or in a gel, and the new system, herein proposed, by means of which relatively intense beams of coloured light may be produced from more or less ordered arrays of solid particles of a specific size range by a diffraction phenomenon.

In accodance with our invention, we provide a method of preparing opaline materials comprising the steps of preparing a suspension of spherical amorphous silica particles within the size range of 150–450 millimicrons, and packing the particles into an ordered close-packed array.

The invention also includes a method as referred to in the preceding paragraph and wherein, after the particles have been packed into an array, the spatial arrangement of the particles constituting the array is stabilized. This stabilization may be brought about in various ways such as by drying, heating, or bonding the particles together by means of a suitable cement.

More particularly, our invention resides in a method of preparing opaline materials by growing numbers of spherical amophous silica particles using an aqueous solution of silica as the mother liquor and colloidal hydrous silica particles as nuclei, separating from the liquor a fraction comprising monodisperse particles having a substantially uniform diameter within the range 150–450 millimicrons, packing the said particles into a close-packed array and stabilizing the spatial arrangement of the particles constituting the array, the said array being sufficiently ordered to provide a material giving rise to diffracted coloured light beams when illuminated with white light.

The packing of the particles into ordered close-packed arrays may be achieved by sedimentation techniques or by a combination of sedimentation on to a flat or curved surface with concurrent removal of the suspending medium.

The range of diffraction colours seen in any particular sedimented system depends on the particle size selected for settling. As would be expected from the relationship described above, a suspension of silica particles of diameter 350 millimicrons produces a material, when settled into a close-packed ordered array, which gives diffracted beams of red light of relatively high spectral purity when illuminated with white light and viewed at angles of incidence and reflection near the normal, for example when the light source is almost directly behind the eye of the observer. As the eye is moved relatively to the specimen, with the position of the light source held steady, the colours progressively change to tints characteristic of shorter wave lengths in the visible spectrum until as grazing angles of incidence are approached, the greenish-blue or blue-violet colours then remaining fade away because total internal reflection prevents the coloured beams from passing out through the air-specimen interfacial surface.

An array of relatively large monodisperse particles, near the upper limit of the range of particle diameters capable or giving colour effects when in stable close-packed arrays, gives the most extensive variety of spectral colours according to angle of incidence of white light and angle of reflection, and is therefore the preferred type of array. The optimum particle diameter for a hydrous silica array is approximately 350 millimicrons, a size capable of giving red-orange-yellow-green colours from one single close-packed array. If a particle size is selected from the lower limits of the useful range of diffracting particle diameters, the arrays formed will show a shorter wavelength colour at normal incidence and as the eye is moved towards the grazing angle, only the limited range of spectral colours of shorter wavelength is seen. In the extreme case, with close-packed uniform arrays of particles only 150 millimicrons in diameter, the only colour seen is a flash of violet light at an angle of incidence near the normal.

At the other extreme of the useful particle diameter range of 150–450 millimicrons, no colour is seen at normal incidence and the eye must be moved around to lower angles of incidence and reflection before the long wavelength red colours begin to appear, therefore the variety of the play of colours is again restricted.

The process of our invention in producing diffracting arrays of amorphous silica particles, is primarily concerned with the size, uniformity and perfection of arrangement of the particles and not with any particular method of preparing the particles. Some latitude is accordingly possible in the first stage of production of the material, namely, the technique of preparing uniformly sized silica spheres in the range 150–450 millimicrons.

Particles of the size required for producing diffracting arrays according to the invention may be prepared by heating a pure silica sol, prepared by de-ionizing a sodium silicate solution with ion-exchange resins suitable for the removal of both cations and anions, for periods of many hours, 30 to 300 hours for example, at 100° C. to promote growth of secondary colloidal spheres by aggregation of the very small particles present in the sol at the time of formation from sodium silicate solution. In order to prevent undesired gelation of the sol during this heat treatment, enough pure sodium hydroxide is added to keep the pH of the sol above 7.5 throughout the period of heating. As the secondary spheres grow by aggregation of minute primary particles, there is a tendency for spheres to link together and form irregular masses joined along interfaces by common layers of primary particles. These irregular masses, being of larger effective diameter than individual spheres at any given stage of growth, are removed by successive centrifuge treatments of the colloidal system at regular intervals. For the purpose of supplying nutrient primary sol particles, of diameter below 10 millimicrons, to the growing secondary spherical aggregates, small amounts of freshly de-ionized sodium silicate solution are added to the mother liquor throughout the heating period. After a total heating period of 100 hours, secondary spheres 250–350 millimicrons in diameter generally exist in quantity in the system.

A feature of the general method of aggregating small sol particles into spherical secondary particles is particularly germane to our process of fabricating arrays capable of diffracting light. This feature is that the growth process is slow and regular enough to provide a means of controlling the size and the size distribution of the spheres to an extent sufficient to permit the operation of the second stage of our process, namely, the selection of a size distribution narrow enough to allow the formation of an ordered close-packed array. According to the care taken in preserving the heated colloidal system free from contaminating divalent cations and anions, a substantial proportion of all spheres present in a suspension at the end of 100 hours of heating may exist within a particle size range of 250–350 millimicrons and in a dispersed condition, as distinct from a partially flocculated state. Aggregates of two or more spheres should therefore be of relatively rare occurrence. This is an important prerequisite for the next step of our process and is one which can be achieved more readily by preparing spheres from pure sol systems than by any other technique known to us.

Having produced a suspension of amorphous hydrated, silica spheres with a particle size distribution largely between the limits 250 and 350 millimicrons, the distribution being designed to contain as great a proportion as possible of particles of the size desired for the colour effects to be produced in the final material, the next step in our process is the preparation of an ordered close-packed array. This may be done in various ways, each designed to select a size distribution capable of forming an array regular enough to diffract light.

According to one technique, the aqueous suspension is allowed to sediment in a tall cylinder in a constant temperature environment for a few weeks. Layers of particles form at the base of the suspension within a few days and gradually become more sharply defined as diffracting and non-diffracting layers. When the system has stabilized and no further obvious changes in the characteristics of the layers are taking place, a fine-tipped thin pipette is carefully lowered to the level of a selected diffracting layer and the particles are drawn up into the pipette without gross disturbance of layers, above and below, that show different diffraction effects or no colours. The selected material is then taken in the pipette and introduced into a short vertical cylinder where it is again left to sediment for a period of another week or more until diffracting arrays again form spontaneously.

According to another technique, the original suspension of 250–350 millimicron particles is placed in a centrifuge and subjected to a g-value in the range 200–600 for a period sufficient to bring a fraction of the particles down as a semi-solid cake at the base of the tube. The supernatant suspension is removed and re-centrifuged to obtain further selection of sedimented material which will show an enhanced play of colours. The original cake may be re-dispersed by boiling and shaking, then subjected to repeated centrifuging treatments at slightly lower g-values than those first used. The basis of this repeated splitting of the sedimented cake and residual suspension is simply to fractionate the original suspension into sharper size distributions, some of which will show the desired range of diffraction colours in a sedimented cake at some stage in the treatment.

It will be apparent that if the colours in a freshly made mechanically soft cake of ordered particles are to be retained, the geometrical arrangement of the close-packed particles must be preserved from distortion. This may be effected by sealing the diffracting cake in a close-fitting transparent containing medium such as glass or an organic plastic. We have found that such systems are convenient for producing decorative objects showing a play of colours when illuminated with white light. Such objects represent one extreme of the range of products made by the general technique of producing solids capable of diffracting light by the action of 3-dimensional arrays of uniform particles within a defined particle size range. The product in this case comprises an undried composite mass of solid particles with enough residual liquid present to just fill the interstices between them.

When it is desired to produce a stabilised array that will not deform and lose its diffracting characteristics when handled, even though no rigid transparent protective shell exists around the outside of the mass, the particles must be bonded together whilst still in the regular configuration product by sedimentation from a suspending liquid medium. The fact that silica particles prepared by our preferred technique of growth in an aqueous medium are hydrated, permits some degree of inter-particle bonding to be developed by drying the particles without mechanical distortion of the array. Traces of dissolved silica are deposited from the evaporating solution between the particles and act as cement to bond the particles together, but also there is a degree of surface welding developed between particles in contact in the array as combined water is removed from the hydrous silica as drying proceeds.

The drying process may be prolonged for weeks at a temperature of 100° C. to promote the progressive loss of water from the hydrous silica and increase the extent of inter-particle welding, or the temperature may be increased to any value short of the melting point of silica for a period sufficient to promote welding of adjacent close-packed particles without destruction of the optical characteristics of the array. The extent to which drying and/or heating of the arrays is carried out in practice depends on two considerations, the degree of mechanical strength that is desired to be imparted to the ordered mass of particles and the refractive index that is desired for the dry particles.

If desired, additional fresh silica sol containing only particles less than 10 millimicrons in diameter may be introduced into the suspension of particles just prior to sedimentation to increase the amount of cementing silica remaining in the array during the dry step. As the cementing silica is thus subjected to the same drying and/or heat treatment as the spherical particles, the refractive indices of both components will be the same. If all optical discontinuities between the particles and the cement were eliminated by the complete filling of all interstices between the particles with the cement, the product would be merely a glassy transparent form of silica devoid of diffraction colours. Accordingly, it is necessary to ensure that the voids between the particles are only partially filled with cement in the final product to preserve the degree of optical inhomogeneity required for the production of diffraction colours.

According to another method, a sedimented mass of particles is brought into contact with fresh dilute silica sol or other suitable cementing medium such that, on drying, silica or other cement is deposited in the voids between the particles. In order to obtain the required degree of transparency, the method may need to be repeated a number of times. If in the final product, drying has not established a difference between the refractive indices of the particles and the cementing medium, it is necessary, as pointed out above, that the voids shall not be completely filled.

It will also be apparent that techniques of sintering or welding particles together by heat treatment may be combined with the introduction of extra cementing silica added in fresh sol form and deposited between the particles by subsequent drying. It is known that drying of hydrous silica particles at temperatures up to 100° C. causes a drop in the refractive index, while subsequent heating of the particles to higher temperatures will cause an increase in the refractive index. It is therefore, desirable that the refractive index of the particles should be checked and adjusted by suitable drying or heat treatment towards a specific range that will be determined by the refractive index which the cementing substance will have in the final product. Thus, before introducing silica sol to act as a cement when dried out in the interstices of a sedimented cake, the refractive index of the particles constituting the cake is adjusted, such as by heat treatment of the cake in an oven, to a desired value which is preferably 0.05, and more preferably 0.02, above the refractive index of the cementing silica. Since the refractive index of the cement will ultimately reach some value in the same range (1.44–1.48) as that of the spheres in the array depending on the extent to which the cement is subsequently dried and heat treated, it is necessary to arrange for the initial heat treatment of the spheres to be more intense than that to which the cementing silica is eventually subjected, in order to preserve the preferred refractive index difference between the spheres and the cement. In order to achieve this, we prefer to first thoroughly dry the array of spheres at 100° C. for several hours, then raise the temperature to the range 400–600° C. for an hour.

In general, in cases where the optical inhomogeneity required for production of diffracted beams is produced by differences between the refractive indices of the particles in the array and a cementing medium, that difference should lie between 0.1 and 0.01, the best results being observed with a difference of about 0.02.

The process of introducing cementing silica into an array of heat-treated spheres is essentially the evaporation of silica sol which has diffused into the porous cake of spheres. Since the pores in the close-packed array are too minute to permit sol particles larger than 10 millimicrons in diameter to penetrate into the mass, freshly made silica sol, containing only particles less than 10 millimicrons in diameter should be used. We have found that such fresh sols, containing no more than 1% total silica, are satisfactory cementing media, having a viscosity low enough to permit rapid diffusion into the close-packed masses of spheres. It will, however, be readily apparent to those skilled in techniques of cementation that many practical variations of the general technique are possible, but in general the simple method of allowing the array to remain in an evaporating pool of fresh sol serves to introduce the hardening medium and impart some degree of translucency to the diffracting array. As a guide to the conditions that are necessary to produce the optical characteristics with which we are concerned, we instance the following techniques that have been found to be successful in preserving both the spatial arrangement of particles in arrays and the degree of optical inhomogeneity necessary to produce diffraction colours:

(a) Sedimentation in a centrifuge for a period of 30 minutes at 500 g. to form a compact mass of hydrated silica spheres arranged in an ordered array. The mass has the consistency of soft rubber and contains 5–30% of aqueous liquid present interstitially between the particles. The refractive index of the particles is between 1.43 and 1.45 while the refractive index of the liquid is between 1.33 and 1.40. The mass is then enclosed in a close-fitting transparent rigid shell to prevent subsequent distortion and destruction of the array.

(b) Sedimentation of particles into a diffracting array from an aqueous medium containing 0.1–5.0% of fresh silica sol of particle size below 10 millimicrons, removing the supernatant liquid and drying the ordered mass of particles and interstitial sol to produce a cemented rigid diffracting mass comprising ordered particles cemented together by an amount of deposited silica insufficient to fill any substantial proportion of the interstitial spaces between the particles. The refractive index discontinuities which are required for producing the desired diffraction beams are those between the particles and air.

(c) Sedimentation of particles into a diffracting array from an aqueous medium containing less than 0.1% silica in sol or solution form, drying the ordered mass at 100° C. to form a rigid but fragile mass, and impregnating this mass with a material comprising methyl methacrylate and polymeric forms thereof, the refractive index discontinuities between the particles and the plastic cement being arranged to be between 0.1 and 0.01.

(d) Sedimentation of particles into a diffracting array from a aqueous suspension containing less than 0.1% silica in sol or solution form, drying the ordered mass and firing at 600° C. for a period between 1 and 5 hours until a strong solid is obtained with a refractive index between 1.46 and 1.48. This solid is then impregnated with a transparent bonding medium having a refractive index within 0.05 above or below, but not equal to, that of the fired particulate array.

The invention is further illustrated by the following examples.

EXAMPLE 1

A silica sol containing 2.4% silica by weight was prepared by passing sodium silicate solution through successive columns of the hydrogen form of the cation exchange resin "Zeokarb 225" and the hydroxyl form of the anion exchange resin "De-acidite FF" until the content of anions other than silicate and hydroxyl fell below 0.1% and the pH reached a value of 4.5. Pure sodium hydroxide was added to this sol to bring the pH to a value of 9.0 and the sol was boiled for 24 hours with continuous addition of fresh sol at a rate equal to the rate of loss of water from the sol by evaporation, the pH being maintained within the range 7.5–11.0 by periodic addition of sodium hydroxide. The sol was then cooled to 20° C. and allowed to stand for 16 hours, then decanted from a layer of irregular fragments of amorphous silica that had settled out, and returned to the boiling flask. After a further period of boiling for 6 hours, the cooling and settling routine was repeated. After 6 such cycles of boiling, cooling, settling and decanting, the sol was found to contain mainly particles in the range 40–80 millimicrons, measured as actual diameters of spheres observed in the electron microscope.

From this stage on, the sol was boiled under the same conditions as before, but every 6 hours was cooled and centrifuged instead of being allowed to settle. Centrifuge conditions were 500 g. for 5 minutes, the cake being discarded and the supernatant sol then re-centrifuged for 30 minutes at 800 g., the cake being retained and the liquid discarded. The retained cake was re-dispersed in the boiling flask in distilled water to the original volume of the sol and the cycle of boiling under the previous conditions of addition of fresh sol and sodium hydroxide, cooling after 6 hours, centrifuging to isolate the second cake and returning to the boiling flask, was resumed.

After 4 such cycles, optical diffraction effects exhibited by the cake obtained in 30 minutes at 800 g. and observations under an electron microscope on the particles in the cake showed that a satisfactory range of particle sizes had been obtained between 250 and 350 millimicrons. The cake was than re-dispersed in distilled water and centrifuged for 30 minutes at 400 g., the cake being removed from the supernatant liquid and the centrifuging repeated. The final cake thus produced was removed from surplus liquid and sealed in a glass container, and possessed a brilliant display of colours.

EXAMPLE 2

A suspension of amorphous hydrated silica particles having a mean diameter of 300 millimicrons and a spread of particle sizes between 250 and 350 millimicrons, the amounts of material on either side of the mean falling sharply away from the peak at the mean diameter, was obtained by growing spherical aggregates of sol particles in an aqueous medium as described in Example 1, the final centrifuge cake obtained being redispersed in distilled water containing 1% of fresh silica sol particles less than 10 millimicrons in diameter. After centrifuging for 30 minutes at 400 g., an optically diffracting cake was obtained and this was allowed to dry out in the centrifuge tube over a period of one month, after removal of all supernatant liquid except a volume equivalent to twice the volume of the cake. When dry, the cake had contracted sufficiently to allow removal from the tube and was found to have become cemented with the dried fresh silica sol component to an extent sufficient to give mechanical strength to the cake and a degree of transparency that permitted diffraction colours to be seen in the body of the cake.

EXAMPLE 3

A suspension of amorphous hydrated silica particles within the size range of 200–400 millimicrons diameter, was prepared by essentially the procedure described in Example 1 except that the final steps of fractionation by centrifuging at 400 g. were not carried out, the cake separated at 800 g. from the final boiling stage being simply redispersed in water and allowed to stand in a settling cylinder 30 cm. in height, for a period of 8 weeks. This produced settled layers of particles which formed optically diffracting arrays several millimetres thick on the removable plane glass base of the settling cylinder. After removal of the supernatant water and un-sedimented silica particles that had too small a diameter to form a compact layer, the diffracting layers were dried out on the supporting glass plate and the assembly detached from the cylinder. On drying at 100° C., the ordered layers of particles gained sufficient strength to permit stripping from the glass plate and the stripped slab was then fired to 600° C. and divided into smaller specimens. The specimens were impregnated with various liquids of refractive index in the range 1.33–1.54 to demonstrate the variation in the appearance of the material as the difference between the refractive index of the silica spheres in the arrays, 1.475, and that of the impregnating substance, was made larger or smaller. The maximum intensity of diffracted coloured beams and the minimum intensity of scattered white light was observed with impregnating media such as partially polymerised methyl methacrylate, having a refractive index within the range 1.49–1.50 or cyclohexane, with a refractive index 1.44.

EXAMPLE 4

A suspension of hydrated silica spheres 250–350 millimicrons in diameter was prepared by the procedure described in Example 1 and was placed in a settling cylinder 30 cm. in height, the suspension filling the cylinder. After standing for a week, a white opaque layer 5 mm. in height collected at the base of the cylinder and was overlain by a more diffuse layer of particles in which pink and green colours became visible. After a further week, the diffuse layer had contracted down to a sharply defined layer 1 cm. in height, in which particles had become spontaneously oriented into brilliantly coloured close-packed arrays grading from red at the base to green at the top. Without disturbing the system more than a minimum extent, a pipette was used to withdraw material from the mid-point of the diffracting arrays. This material was transferred to a vertical tube 2 cm. in height and 2 cm. in diameter with an open upper end and the open lower end closed off by a fine filter paper and a supporting glass plate. The junction of the paper and supporting plate with the lower end of the tube was sealed with wax to prevent leakage of the liquid.

After leaving the tube until the liquid contents had evaporated, the cake of particles, which had re-oriented in diffracting arrays during the evaporation period, was carefully removed from the tube by stripping off the wax seal and lifting the tube away from the paper and supporting plate. The cake of particles was then dried at 100° C., the filter paper peeled off and the cake heated for 2 hours at 600° C. The cake was then soaked in fresh 1% silica sol and then allowed to dry. Silica was thus deposited within the pores of the cake, thereby increasing the transparency, enhancing the faint diffraction colours that had been observable in the dry, opaque cake, and cementing the mass together.

EXAMPLE 5

An ordered array of hydrated silica particles was prepared by the procedure of Example 3, then dried, fired to 600° C. for 2 hours, cooled and soaked in fresh 1% silica sol which was then allowed to evaporate and deposit silica cement between the particles in the arrays.

EXAMPLE 6

An ordered array of silica particles was prepared by the procedures of Example 3, then dried and fired to 1200° C. to develop high mechanical strength and some transparency in the mass.

We claim:
1. A method of preparing light-diffracting synthetic opal exhibiting the optical effect found in precious opal comprising the steps of preparing a suspension of spherical non-flocculated amorphous silica particles of substantially uniform size, which size being within the range of 150–450 millimicrons, and packing the particles into an ordered close-packed light-diffracting array.

2. A method as in claim 1 wherein the interstices between the particles in the close-packed array have a maximum dimension of about 10 millimicrons.

3. A method as in claim 1 wherein the particles are packed into the ordered close-packed light-diffracting array by allowing the suspension to sediment under gravity.

4. A method as in claim 3 wherein a layer of the sediment is removed and said layer is allowed to resediment under gravity.

5. A method as in claim 1 in which the spherical silica particles are prepared by heating at 100° C. a silica sol substantially free of flocculating anions and polyvalent cations for a period of about 30 to 300 hours while maintaining the pH at a value between 7.5 and 11.0, separating any resulting fluocculated material from the sol by successive centrifuge treatments, adding fresh deionized silica sol containing particles having a size below 10 millimicrons to the mother liquor during the heating period to keep said liquor substantially at constant volume, and separating a fraction of the spherical particles present in the suspension at the end of the heating period, the particles in said fraction having a size within said range.

6. A method as in claim 1 wherein the particles are packed into the ordered close-packed light-diffracting array by centrifugation.

7. A method as in claim 6 wherein the centrifugation is carried out at 200–600 g.

8. A method as in claim 1 including the further step of bonding the particles constituting the array to one another thereby stabilizing the spatial arrangement of said particles while preserving the light diffracting character of the array.

9. A method as in claim 8 wherein the particles are bonded to one another by drying the particles constituting the array at a temperature up to about 100° C.

10. A method as in claim 8 wherein the particles are bonded to one another by heating the particles constituting the array at temperatures between 400° and 900° C.

11. A method as in claim 8 wherein the particles constituting the array are bonded together by means of silica.

12. A method as in claim 8 wherein the particles constituting the array are bonded together by means of a cement having a refractive index differing from that of said particles between the range of 0.01 to 0.10.

13. A method as in claim 12 wherein the difference in refractive index between the particles and the cement is about 0.02.

14. A method as in claim 10 wherein the particles, after being heated, are cooled, soaked in fresh silica sol, and then dried to cause the deposit of silica within the interstices between the particles in the array.

15. A method as in claim 11 wherein fresh silica sol is introduced into a suspension of the particles before they are packed into the array, the amount of additional silica thus provided being such that the interstices between the particles in the array are only partially filled with said silica sol.

16. A method as in claim 11 wherein a cementing medium is introduced into the interstices between the spherical silica particles, after being packed into the array, said cementing medium being selected from the group consisting of silica sol, methyl methacrylate and polymers thereof.

17. A method as in claim 16 wherein the amount of cementing medium is such that the interstices between the particles in the array are only partially filled with said cement medium.

18. A method as in claim 16 which includes adjusting the refractive index of the spherical particles by dehydrating said particles before introducing into the interstices between said particles said cementing medium to an extent such that the refractive index of the dehydrated particles differs from that of the cementing medium by an amount ranging from 0.01 to 0.05.

19. A method as in claim 18 wherein the particles are dehydrated at a temperature ranging between 400° to 600° C.

20. Light-diffracting synthetic opal exhibiting the optical effect found in precious opal comprising a close-packed array of spherical amorphous silica particles of substantially uniform size within the range of 150–450 millimicrons, the array being so ordered as to give rise to diffracted colored light beams when illuminated with white light.

21. The light-diffracting synthetic opal as in claim 20 wherein the particles are cemented together with a cementing medium which completely fills the voids between the particles and has a refractive index differing from that of the particles by an amount ranging between 0.01 to 0.10.

22. The light-diffracting synthetic opal as in claim 20 wherein the particles are cemented together with silica which only partially fills the voids between the particles and has a refractive index the same as that of the particles.

References Cited

UNITED STATES PATENTS

| | | | |
|---|---|---|---|
| 3,325,321 | 6/1967 | Shannon | 106—40 X |
| 2,574,902 | 11/1951 | Bechtold et al. | 252—313 |
| 3,301,635 | 1/1967 | Bergna et al. | 23—182 |

FOREIGN PATENTS

| | | |
|---|---|---|
| 1,111,775 | 7/1955 | Germany. |

OTHER REFERENCES

Kraus, E. H. and Slawson, C. B.: Gems and Gem Materials, New York (McGraw-Hill), 1941, pp. 38–9, 188–91, 252–3.

Naboko, S. I. and Silnichenko, V. G.: Formation of Silica Gel on the Solfataras of Goloynin Volcano on Kunashiri Island, in Geochemistry, No. 3, Ann Arbor, Mich., Geochemical Society, 1960: Trans. Journ. Acad. Sc., U.S.S.R., 1957, pp. 303–306 (Library of Congress).

Debye, P., Light Scattering in Solutions, in Journal of Applied Physics, 15, New York, Amer. Inst. of Physics, April 1944, pp. 338–342.

HELEN M. McCARTHY, Primary Examiner

W. R. SATTERFIELD, Asssitant Examiner

U.S. Cl. X.R.

23—182; 106—74, 84; 260—41; 264—311